United States Patent

Normand

[19]

[11] Patent Number: 5,929,914
[45] Date of Patent: Jul. 27, 1999

[54] METHOD AND DEVICE FOR GLOBAL BITRATE CONTROL OF A PLURALITY OF ENCODERS

[75] Inventor: Guy Normand, Sucy-En-Brie, France

[73] Assignee: U.S. Philips Corporation, New York, N.Y.

[21] Appl. No.: 08/744,162

[22] Filed: Nov. 12, 1996

[30] Foreign Application Priority Data

Nov. 15, 1995 [FR] France .................. 95 402563

[51] Int. Cl.⁶ .................................................. H04N 7/12
[52] U.S. Cl. .......................................... 348/405; 348/419
[58] Field of Search .................................... 348/403, 405, 348/419, 397, 416, 415, 404, 699, 385, 398, 409; 364/715.02; 395/200.77; 382/251; H04N 7/12

[56] References Cited

U.S. PATENT DOCUMENTS

| | | | |
|---|---|---|---|
| 5,231,484 | 7/1993 | Gonzales et al. | 348/405 |
| 5,606,371 | 2/1997 | Klein Gunnewiek et al. | 348/405 |
| 5,608,652 | 3/1997 | Astle | 364/715.02 |
| 5,612,899 | 3/1997 | Pan et al. | 395/200.77 |
| 5,680,483 | 10/1997 | Tranchard | 348/405 |
| 5,745,178 | 4/1998 | Hartung et al. | 348/405 |
| 5,757,434 | 5/1998 | Klein Gunnewiek et al. | 348/405 |

OTHER PUBLICATIONS

"MPEG: A Video Compression Standard for Multimedia Applications", by Didier LeGall, in Communications of the ACM, Apr. 1991, vol. 34, No. 4, pp. 47–58.

*Primary Examiner*—Bryan Tung
*Assistant Examiner*—Gims Philippe
*Attorney, Agent, or Firm*—Laurie E. Gathman

[57] ABSTRACT

In accordance with the MPEG-2 standard for compression of a digital signal representative of a video image, the image is separated into groups of several different types of pictures and those of each type are encoded by respective encoders. Depending on the complexity and bitrates of each picture, the bitrates of the encoders may vary and so must be restored to a constant bitrate by respective output buffers. Also, the global sum of the contents of the individual buffers must be maintained substantially constant so as to provide a constant global bitrate. The invention provides a method and apparatus for bitrate control of each encoder based on a measure of the complexity of the picture being processed thereby and the bitrates which are required in order to maintain a substantially equivalent quality of the pictures encoded by the respective encoders.

6 Claims, 3 Drawing Sheets

METHOD AND DEVICE FOR GLOBAL BITRATE CONTROL OF A PLURALITY OF ENCODERS

BACKGROUND OF THE INVENTION

The invention relates to a method of controlling the bitrate of an assembly of video encoders of the MPEG type each processing, in parallel, an individual video signal, the pictures to be encoded being of a different type T referred to as I, P, or B, respectively, dependent on whether they are submitted to an intraframe encoding mode independent of any other picture, or to a predictive encoding mode employing a unidirectional motion prediction based on another intraframe-encoded or predicted picture, or to a bidirectional interpolation encoding mode based on a previous picture and a subsequent picture.

The invention also relates to a device for carrying out said bitrate control method.

It is known that the encoded pictures of different sequences have equivalent qualities when they are encoded using the same quantization step before correction due to adaptive spatial activity (by means of quantization), and that the encoders are not submitted to any restrictions. That is, the structures of the groups of pictures, or GOPs, may be different and picture synchronism between the encoders is not necessary. The MPEG standard defined by the International Standardization Organization ISO is described, for example in the document "MPEG: A video compression standard for multimedia applications", D. Le Gall, Communications of the ACM, April 1991, Vol. 34, No. 4, pp. 46–58. In an assembly of encoders of the MPEG type, as in the present application, each encoder has an output buffer memory or buffer (a buffer is a memory which receives bits at a variable bitrate and restores them to a constant bitrate, or conversely in the case of decoding). The global contents of a global buffer corresponding to the sum of the contents of the individual buffers constitute an indicator with which the encoding bitrate can be controlled by acting on the quantization step. The fluctuations of the global buffer contents, which are caused by the difference between the instantaneous encoding bitrate and the transmission bitrate, depend on the quantization step and on the type of picture being encoded at any instant (pictures of the type I, P, B referred to as intraframe-predicted, or interpolated pictures in accordance with the encoding mode as indicated above). These considerable bitrate fluctuations also occur in the buffers of the encoders and in the similarly provided buffers of the decoder after the transmission and/or storage of the encoded signals, and give rise to a considerable delay between encoding and decoding of a picture.

SUMMARY OF THE INVENTION

It is an object of the invention to provide a bitrate control method that distributes a constant global bitrate among several simultaneously operating encoders of the MPEG-2 type in order that a quality which is substantially equivalent for each of these encoders is obtained at any instant, irrespective of the complexity of the encoded pictures, and with which the delay between encoding and decoding of a picture can be reduced.

To this end, the invention relates to a bitrate control method as defined in the opening paragraph, which method comprises the steps of:

(a) determining the complexity of each considered picture, said complexity being equal to the product of the number of bits used for coding a picture and the mean quantization step;

(b) determining, for each encoder and each picture, a picture complexity coefficient which is inversely proportional to the complexity of the previous picture of the same type T, and proportional to the sum of the complexities of all the pictures of the group of pictures the considered picture belongs to;

(c) computing the quantization step for each macroblock of the considered picture, determined by the product of a fixed reaction coefficient and the contents of a virtual buffer, said contents being equal to the product of said picture complexity coefficient and the number of bits employed by the relevant encoder within a given time interval, minus the average number of bits which can be transmitted within said time interval, for a global bitrate D.

The method according to the invention consists of computing a picture of the real global buffer, which is referred to as virtual global buffer and in which the fluctuations related to the type of encoded picture are reduced by means of smoothing. The control of the contents of this buffer then allows the global bitrate to be controlled by adjusting the quantization step for each of the assembly of encoders. This combined bitrate control allows to stabilize the sum of the bitrates of the assembly of encoders, to maintain a substantially equivalent quality, irrespective of the encoder, and to improve the conditions of general management of the assembly of buffers by optimally distributing the bitrate fluctuations among the buffer of the "encoding" section and the buffer of the "decoding" section, which provides the possibility of decreasing the delay between encoding and decoding of a picture.

It is another object of the invention to provide a device for carrying out the bitrate control method according to the invention.

To this end, the invention relates to a device for controlling the bitrate of an assembly of video encoders of the MPEG type each processing, in parallel, an individual video signal, the pictures to be encoded being of a different type T referred to as I, P, or B, respectively, dependent on whether they are submitted to an intraframe encoding mode independent of any other picture, or to a predictive encoding mode employing a unidirectional motion prediction based on another intraframe-encoded or predicted picture, or to a bidirectional interpolation encoding mode based on a previous picture and a subsequent picture, said device comprising:

(a) at the output of each encoder, a circuit for determining the complexity of each considered picture, said complexity being equal to the product of the number of bits used for coding a picture and the mean quantization step;

(b) a control unit for determining, for each encoder and each picture, a picture complexity coefficient which is inversely proportional to the complexity of the previous picture of the same type T, and proportional to the sum of the complexities of all the pictures of the group of pictures the considered picture belongs to, and computing, for each macroblock of the considered picture, the bitrate of each encoder and its quantization step as determined by the product of a fixed reaction coefficient and the contents of a virtual buffer, said contents being equal to the product of said picture complexity coefficient and the number of bits employed by the relevant encoder within a given time interval, minus the average number of bits which can be transmitted within said time interval, for a global bitrate D.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

Figure 1:
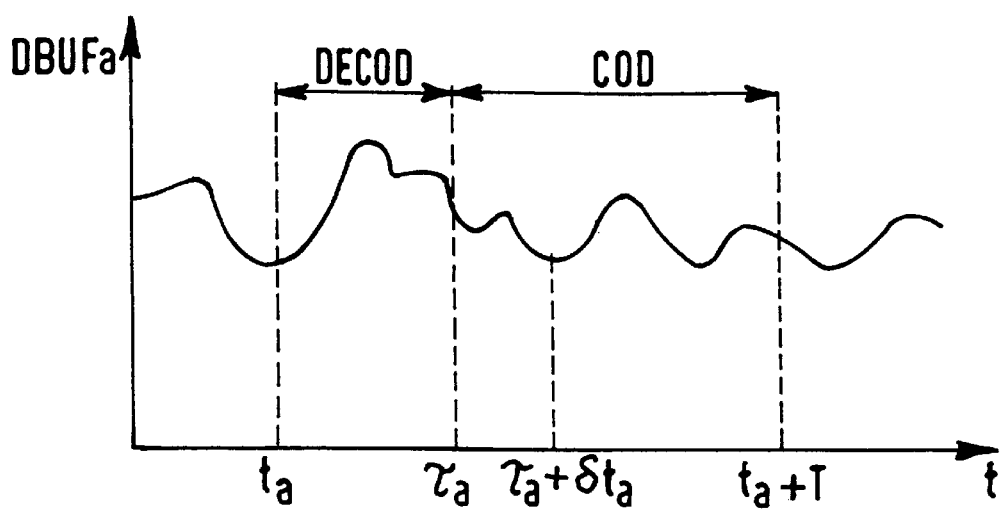
FIGS. 1, 2 and 3 show examples of curves corresponding to instantaneous bitrates DBUFa, DBUFb, . . ., DBUFn of different encoders forming part of an embodiment described hereinafter.

The influence of encoding a macroblock of a picture on the encoding bitrate of a sequence is herein considered to be proportional to the complexity of this picture or, by approximation, to the complexity of the preceding picture of the same type (except for the problem of changing the plane). A complexity coefficient COEF(T) which is inversely proportional to the relative influence of a macroblock on the average bitrate of an encoder may thus be defined, which coefficient depends on the complexity of the encoded picture with respect to the complexity of pictures of a different type and of the GOP structure. This coefficient is given by the expression (1):

$$COEF(T) = \frac{X(I) + NP \cdot X(P) + NB \cdot X(B)}{N \cdot X(T)} \quad (1)$$

with
T=type of picture concerned (I, P or B);
N=number of pictures in a GOP;
NP=number of pictures P in a GOP;
NB=number of pictures B in a GOP;
X=complexity.

The quality of pictures of the same type T may be improved or reduced with respect to the quality of pictures of a different type by multiplying the quantization step relative to these pictures by a constant factor K. The complexity coefficient COEF(T) is now given by the expression (2):

$$COEF(T) = \frac{X(I) + NP \cdot X(P)/KP + NB \cdot X(B)/KB}{N \cdot X(T)/KT} \quad (2)$$

with, for example, KP=1, KB=1.4, and KT=KP or KB.

For each encoder, the contents D(0) of the global virtual buffer is defined by the expression (3):

$$D(O)=D(O)+(NBBT.COEF(T)_c)-NBBT(D) \quad (3)$$

with:
NBBT=number of bits used for each encoder in a given time interval;
c=index of the encoder concerned;
NBBT(D)=number of bits which can be transmitted on average in this time interval for a global bitrate D.

Based on these contents of the virtual global buffer, the quantization step Q(0) for each macroblock or group of macroblocks may be computed by means of a reaction coefficient Réac. Its expression is given by:

$$q0=d0*Réac \quad (4)$$

with: Réac=400/R, in which R is the global bitrate of the assembly of encoders (the reaction time of the control is proportional to the reaction coefficient while the amplitude of the fluctuations of the buffer is inversely proportional thereto).

The variations of the virtual buffer for each GOP are theoretically equivalent to those of the real buffer when the values of the complexity of the pictures of the same type in a GOP are stable, because the values used in expression (2) correspond to the complexity of the preceding pictures of the same type. When the complexity of pictures of the same type of a sequence varies rapidly, particularly during changes of the plane, a deviation of the real buffer may occur. An average bitrate control for each GOP must then be effected, the objective being a correction of the evolution of the real buffer in order to stabilize the global buffer of the encoders at a level which is substantially constant for each instant corresponding to a periodically identical state of the assembly of encoders. This control consists of adjusting, for each GOP, the coefficients COEF(T) of each encoder by multiplying them by a factor λ given by the expression (5):

$$\lambda=(F/N).(D(REF)—D(GLOB))/(R+1) \quad (5)$$

with:
F=frequency of the pictures;
D(REF)=contents of the reference buffer;
D(GLOB)=global contents of the assembly of buffers;
R and N=already defined.

Expression (3) then takes the following form, given by the expression (6):

$$D0=D(0)+(\lambda.NBBT.COEF(T)_c)—NBBT(D) \quad (6)$$

It will be noted that when a considerable variation of the complexity of a picture with respect to the preceding picture of the same type occurs, this generally indicates a change of the plane. The coefficients may then be modified so as to reduce the risks of deviation of the real buffer. For ensuring a good security concerning the variations of the real buffer, the value of the virtual buffer may be a posteriori corrected for each picture by taking the complexity of this picture into account, but experiments have shown that these complementary controls are only useful when the GOP of each encoder has a different structure and when, consequently, the periodicity of the assembly of the system has an effect on a large number of pictures, for example 48 pictures, if the GOPs are composed of 8, 12 and 16 pictures.

For distributing the bitrate in a homogeneous manner throughout the picture, it may be decided to take the non-active macroblocks into account. The number of bits of each active macroblock taken into account for the computation of the virtual buffer is multiplied by a factor η which corresponds to the ratio of the number of active macroblocks NMAA and the total number NTMB of macroblocks per picture:

$$\eta = \frac{NMAA}{NTMB} \quad (7)$$

A residual bitrate DRES is then incremented for each active macroblock:

$$DRES=DRES+NMAA.(1-\eta) \quad (8)$$

and the bitrate taken into account for the non-active macroblocks is given by the expression (9):

$$DMNA = DRES/NMNA \quad (9)$$

NMNA being the number of non-active macroblocks per picture.

The use of the same quantization step for the assembly of encoders provides the possibility of obtaining pictures of an equivalent quality at any instant. However, it may be of interest to increase or decrease the quality of one of the encoders with respect to other encoders, for example, by multiplying the quantization step used by this encoder by a constant factor. As for the control under independent operation, the quantization step may also be modulated for each macroblock as a function of the spatial energy (this operation is effected by the encoder itself on the determined quantization step).

Experiments have been carried out, notably for simulating the simultaneous operation of several encoders with a constant global bitrate. The combined bitrate control effectively achieves the objective of stabilizing the sum of the bitrates of the assembly of encoders and of improving the conditions for general managing of the buffers. In a second operation, one may determine the variations of the bitrate for each of these encoders so that the contents of the encoder and decoder buffers can be managed individually.

Figure 2:
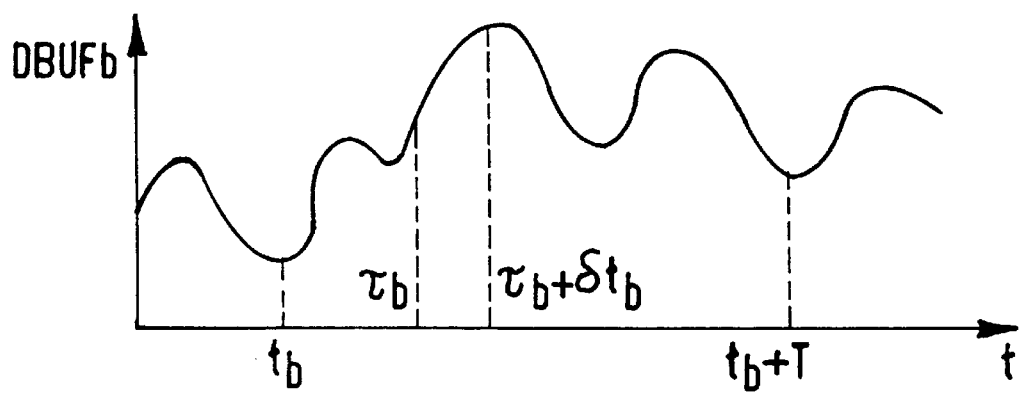
Figure 3:
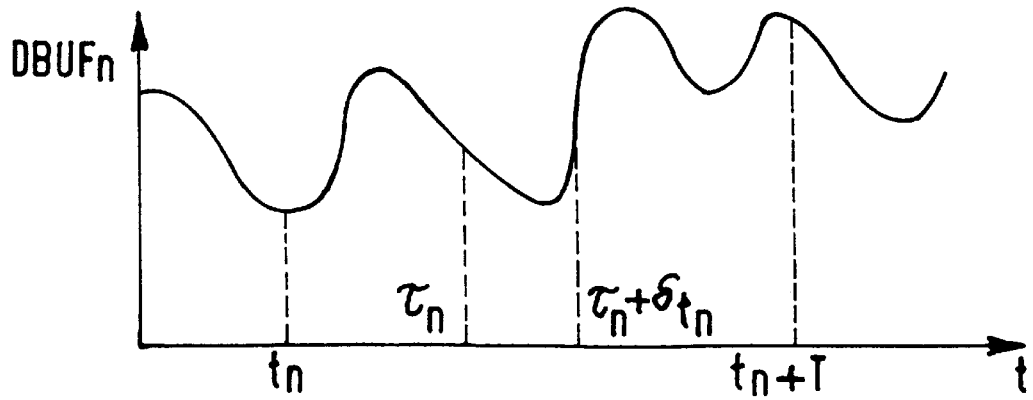

This determination is based on the following principle. For each encoder, the instantaneous bitrate of encoding is represented as a function of time by the function Dbuf(t), t=0 being the start of encoding of the sequence. FIGS. 1 to 3 show three of these instantaneous bitrates DBUFa, DBUFb, DBUFn for three encoders 10a, 10b and 10n of the bitrate control device of FIG. 6 as shown with its n encoders 10a to 10n (this FIG. 6 will be described hereinafter). At the instant $t_i$ (i=a, b, ..., n) the profile of the bitrate within the encoder-decoder buffer is represented by the function DBUF at an interval [ti, ti+T], T being the delay introduced by the buffer. If $\tau_i$ (i=a, b, ..., n) designates the instant corresponding to the physical limit separating the encoder buffer (COD) from the decoder buffer (DECOD), the contents of the buffer of encoder 10a (10b, 10c, ..., 10i, ..., 10n, respectively) are written as:

$$CCBUF1 = \int_{\tau_1}^{\tau_1+T} Dbuf_1(t)dt \quad (10)$$

and the contents of the buffer of the decoder are written as:

$$CDBUF1 = \int_{t_1}^{\tau_1} Dbuf_1(t)dt \quad (11)$$

The transmission rate of each encoder is computed in such a way that the transmission delay is substantially identical for all the encoders and corresponds to the number of pictures contained, on average, in the assembly of buffers. If D is the global bitrate of the assembly of encoders, the number of bits transmitted during a time interval $\Delta t$ is defined as a function of the number of bits transmitted by each encoder:

$$\int_{\tau_1}^{\tau_1+\delta t_1} Dbuf_1(t)dt + \quad (12)$$

$$\int_{\tau_2}^{\tau_2+\delta t_2} Dbuf_2(t)dt + \ldots + \int_{\tau_n}^{\tau_n+\delta t_n} Dbuf_n(t)dt = D\Delta t$$

The objective is to modulate the transmission bitrate for each encoder so as to preserve an identical number of pictures in each buffer. For computing $\delta t_i$, equation (12) is resolved by taking relation (13) into account $$\tau_1+\delta t_1 = \tau_2+\delta t_2 = \ldots = \tau_n+\delta t_n \quad (13)$$

In practice, a table Ibuf[η] representing the profile of the encoder-decoder buffers in a number of encoding bits per time increment is used for each encoder, which table is managed as a FIFO memory (First-In, First-Out) and each element of these tables represents the number of encoded bits during the time increment. These tables contain the data which allow computation of the bitrate of each encoder by taking the restrictions into account which relate to the maximum and minimum sizes of the buffers so as to avoid an overflow or an underflow. After discretization, equation (12) is written as:

$$\sum_{i=k_1}^{p} Ibuf_1(i) + \sum_{i=k_2}^{p} Ibuf_2(i) + \ldots + \sum_{i=k_n}^{p} Ibuf_n(i) = D\Delta t \quad (14)$$

the index p being computed by numerically resolving equation (15):

$$\sum_{i=\inf(k_1\ldots k_n)}^{P} Ibuf_1(i > k_1) + Ibuf_2(i > k_2) + \ldots + Ibuf_n(i > k_n) = D\Delta t \quad (15)$$

$\Delta t$,

The bitrates of each encoder (1 to n) during the time interval $\Delta t$ are written as:

$$d_1 = \sum_{i=k_1}^{P} Ibuf_1(i)/(\Delta t) \quad (16a)$$

$$d_2 = \sum_{i=k_2}^{P} Ibuf_2(i)/(\Delta t) \quad (16b)$$

$$d_n = \sum_{i=k_n}^{P} Ibuf_n(i)/(\Delta t) \quad (16n)$$

Theoretically, the pointers $k_i$ of the index value are equal because they correspond to the index p determined at the preceding step and shifted by a number of cells $\Delta t/\delta \tau$. In practice, these pointers are generally different for the following reasons:
a) the real bitrates are approximate values of the bitrates $d_i$ computed in the preceding step, so the shifts (p→ki) are not rigorously equal to $\Delta t/\delta t$;
b) in certain conditions, the strict regard for equation (15) leads to the risk of overflow of the buffer of the decoder so that it is necessary to temporarily limit the rate by imposing a maximum value p for this encoder;
c) during the connection of an encoder 10i to the control unit (shown in FIG. 6), the pointer $k_i$ will very probably be different from the pointers of the encoders already connected.

The principle of determining variations of the bitrates for each encoder have thus been described, and the practical modalities of the distribution of the bitrate to each encoder will now be indicated. For each encoder, each element of the table is considered to contain the number of bits used for each slice of the picture (here, a slice=45 macroblocks) and the delay introduced by the "encoder+decoder" buffer is 280 ms, i.e. 7 pictures for a picture frequency of 25 pictures/s. The table then contains 7×N elements, N being the total number of slices per picture. The bitrates are computed and thus modified at regular time intervals corresponding to the picture frequency, i.e. 40 ms.

Equation (15) allows determination of the values of the index p which enclose the global bitrate $D\Delta t$, i.e. p and p+1. If S(p) is the left member of equation (15), then: $S(p) \leq D\Delta t \leq S(p+1)$.

The residue $\alpha(S(p+1)-S(p))$ with which equation (15) can be verified is such that:

$$\alpha = (D\Delta t - S(p))/(S(p+1) - S(p)) \quad (17)$$

The theoretical bitrates obtained from equations (16a) to (16n) can then be written as follows, with i=1 to n:

$$d_i = \sum_{i=k_i}^{P} Ibuf_i(i) + \alpha Ibuf_i(p+1)) \bigg/ (\Delta t) \quad (18)$$

and the condition:

$$\sum_{i=1}^{N} d_i = D\Delta t \quad (19)$$

is verified. The theoretical bitrates are then adjusted at values which are compatible with a technique of transmission by means of packets of a fixed length and then transmitted to each encoder. At the end of each transmission period, the number of bits effectively transmitted by each encoder is communicated to the control unit which determines the value of the pointers $k_i$ required for the next computation step.

The control of the contents of the decoder buffer is ensured in the following way. At each instant, the buffer of the decoder must contain one picture at a minimum, which means that the pointer $k_i$ should always be higher than the total number of slices contained in a picture, i.e.

$$\forall t \; k_1 > N. \quad (20)$$

In principle, this condition is always verified, because the bitrates computed for each encoder are such that the number of pictures contained in the buffer of the encoder, and consequently in the buffer of the decoder, is substantially constant.

For the experiments which were carried out, the buffer decoder had an average content of 3 pictures. The buffer of a main profile MPEG2 decoder has a maximum content of 1835008 bits. For considerable bitrates, the number of bits corresponding to three pictures is higher than this limit. As a protection against the risk of overflow of the capacity of the decoder buffer, the computation of the bitrate of each encoder by means of equation (15) is effected with the following condition:

$$\forall t \quad \sum_{i=0}^{P_n} Ibuf_n(i) < 1835008, \quad (21)$$

This means that, when this condition is no longer respected for an encoder, the incrementation of the index p is stopped during the solution of equation (15) and fixed at the next lower value, i.e. $p_n = p_n - 1$. However, a picture cannot have a content which is higher than the capacity of the buffer of the decoder. This result is obtained by limiting the instantaneous bitrate of each encoder. The average bitrate must actually remain lower than the maximum bitrate Dmax of an encoder operating autonomously. At each slice, the number of bits incrementing the virtual buffer must be lower than the number of bits corresponding to the maximum average bitrate for a slice. When this condition is not fulfilled, the quantization step imposed on this encoder is augmented proportionally when this bitrate is exceeded, so as to bring it within acceptable limits again.

Figure 4:
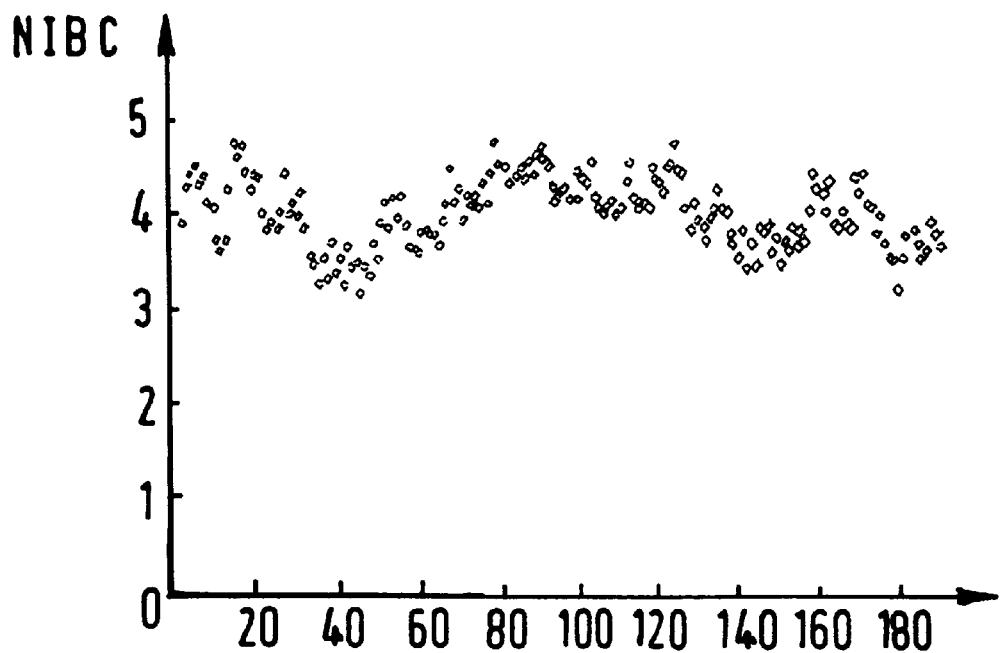
FIGS. 4 and 5 show the number of pictures in a buffer of one of these encoders forming part of said described embodiment, as a function of the succession of pictures, i.e. of the time (expressed in number of pictures in succession) and the bitrate computed every 80 ms (i.e. every two pictures)
Figure 5:
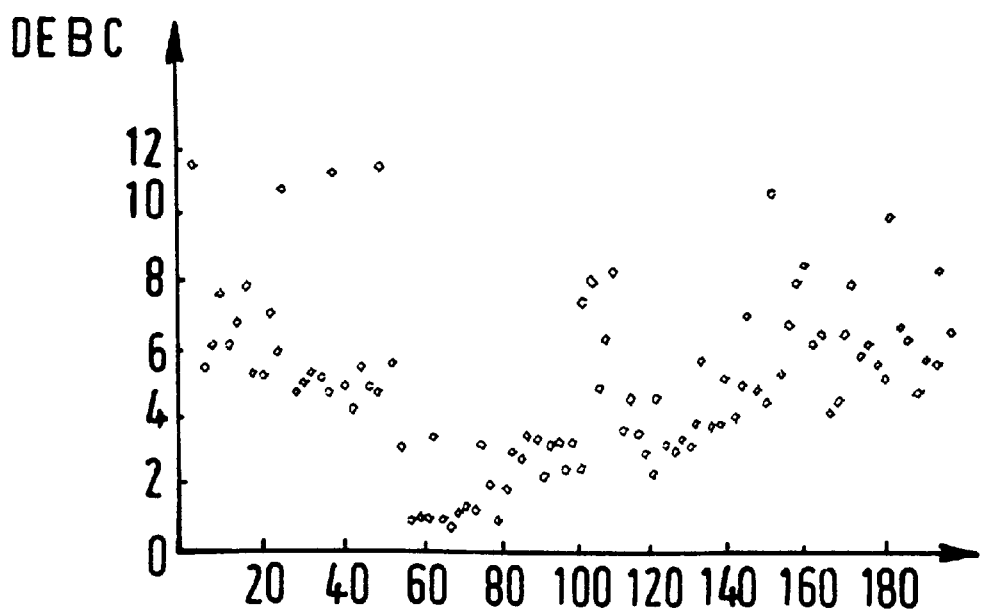

For the experiments carried out (for six encoders) with a view to verifying the validity of the bitrate control method according to the invention, the computation of the transmission bitrates for each encoder is effected simultaneously at constant time intervals, i.e. in the present case, every 40 ms. FIGS. 4 and 5 show the number of pictures NIBC in the buffer of, for example the encoder 10a as a function of the passage of time (expressed in pictures) and the bitrate DEBC (expressed by a coefficient to be multiplied by $10^6$) when calculated every 80 ms. The contents of the buffer (FIG. 4) are comprised between 3.2 and 4.8 pictures in this case and, consequently, the buffer of the corresponding decoder contains between 3.8 and 2.2 pictures, with which a significant reduction of the delay introduced by the buffers, currently equal to 0.28 second, is envisageable. This possibility is particularly interesting for applications of the interactive type.

The advantage of the method of global bitrate control as described hereinbefore, aiming at minimizing the variations of the number of pictures contained in each buffer, is that it improves security in the management of buffers and in achieving an optimal distribution of the considerable bitrate fluctuations among the buffer of the encoder and the buffer of the decoder, which effectively provides the possibility of decreasing the delay existing between encoding and decoding of a picture.

Figure 6:
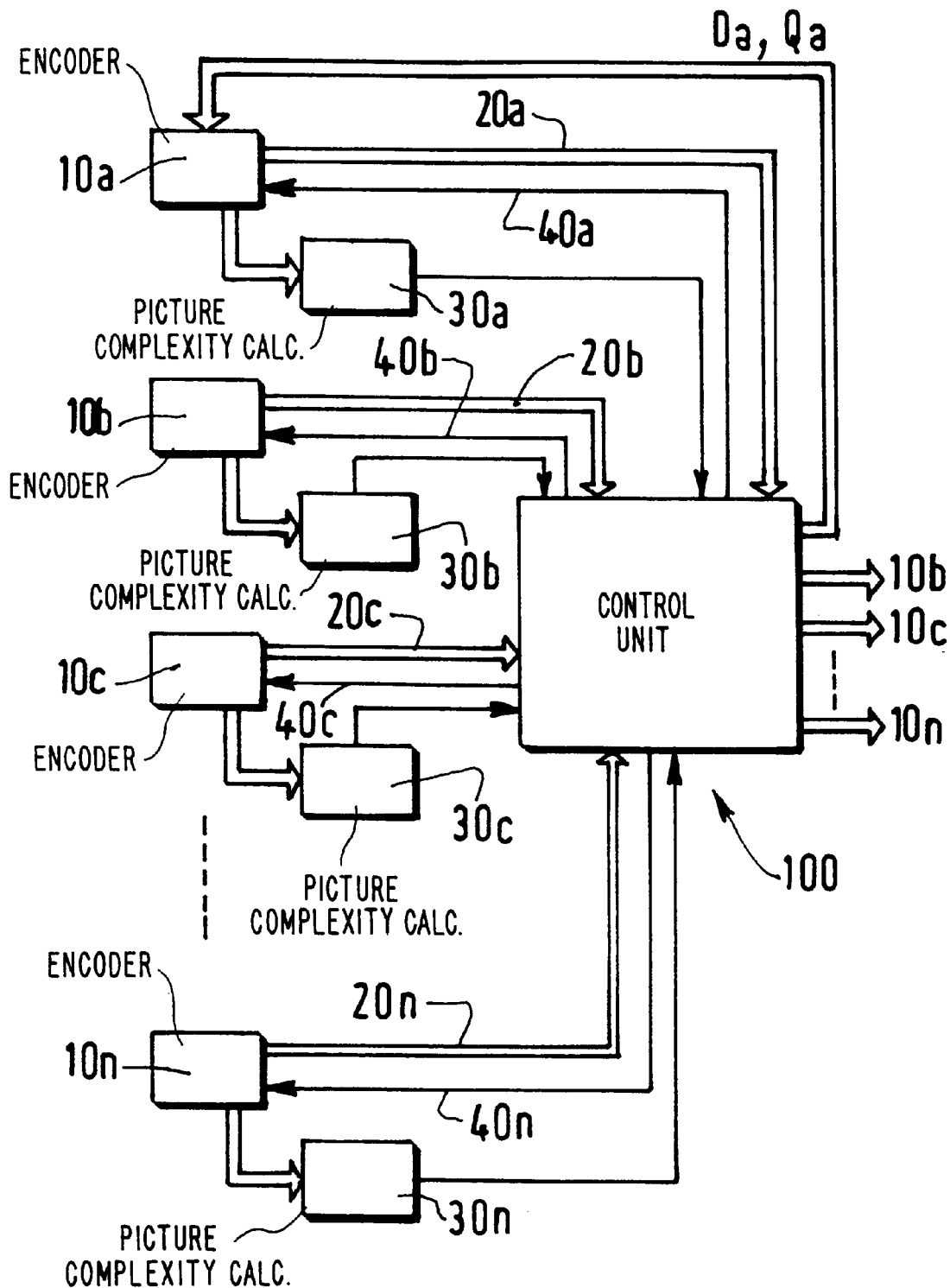
FIG. 6 shows diagrammatically an embodiment of a bitrate control device with which the method according to the invention can be carried out.

FIG. 6 shows diagrammatically how this method can be carried out in accordance with the previous description. The encoding device using bitrate control shown in said Figure comprises N encoders 10a to 10n of the MPEG2 type and a control unit 100 associated with these encoders. The unit 100 receives the following information from each encoder (connections 20a to 20n): the frequency and format of the pictures (25 or 20 Hz; format of 720 pixels×576 lines, arranged in 1620 macroblocks) and the characteristics of the groups of pictures (number of pictures in a group, number of pictures of the type P between two pictures of the type I, number of interpolated pictures of the type B between two non-interpolated pictures, type I, P or B of each successive picture, indication of the active or non-active character of each macroblock, number of bits of each active or non-active macroblock, and contents of the buffer of the encoder at the start of each picture). Circuits 30a to 30n are also provided between the encoders and the unit 100, which circuits are used for determining the complexity of each encoded picture (for example, in accordance with the method of determination described in European Patent Application EP-0 670 663 previously filed by the Applicant). On a return connection, the control unit 100 sends, to each encoder, the bitrate ($D_a$, $D_b$, ..., $D_n$) and the quantization step ($Q_a$, $Q_b$, ..., $Q_n$) determined by said unit when the control method is being carried out.

It should be noted that the invention is not limited to the contents of the previous description, on the basis of which variants may be proposed without passing beyond the scope of the invention. Particularly, a control connection (40a, 40b, 40c, ..., 40n) may be provided between each encoder and the control unit 100, with which control connection one of the encoders may be disconnected so as to make it function in an autonomous rather than a combined way, while the global control method is only used for the (n−1) other encoders.

I claim:

1. A method of controlling the global bitrate of an assembly of video encoders of the MPEG type which concurrently operate in parallel to encode respective video pictures of different types T identified as I, P, or B, respectively signifying an intraframe encoding mode independent of any other picture, or a predictive encoding mode employing a unidirectional motion prediction based on another intraframe-encoded or predicted picture, or a bidirectional interpolation encoding mode based on a previous picture and a subsequent picture; said method comprising the steps of:

(a) determining for each encoder the complexity of each picture presented thereto, said complexity being equal to the product of a number of bits to be used for coding said picture and a mean quantization step to be employed in said coding;

(b) determining for each encoder and each picture presented thereto a picture complexity coefficient which is inversely proportional to the complexity of a preceding picture of the same type T and also is proportional to a sum of the complexities of all the pictures of a group of pictures to which the presented picture belongs; and (c) computing for each macroblock of a presented picture a quantization step determined by the product of a fixed reaction coefficient and the contents of a virtual buffer, said contents being equal to the product of the picture complexity coefficient and the number of bits employed for encoding said picture by the relevant encoder within a given time interval, minus an average number of bits which can be transmitted within said time interval, so as to maintain a predetermined constant global bitrate D.

2. A method as claimed in claim 1, wherein the complexity of each presented picture is proportional to the product $X_j$ of the number of bits $S_j$ for encoding said picture and the mean value $Q_j$ of the quantization steps used for macroblocks of said picture.

3. A method as claimed in claim 1, wherein the complexity of each presented picture is proportional to the product $X_i$ of the number of bits $S_i$ for encoding the picture preceding said presented picture and the mean value $Q_i$ of the quantization steps used for macroblocks of said preceding picture.

4. A method as claimed in claim 2, further comprising a step of modulating the quality of encoded pictures produced by any one of said encoder by multiplying the quantization step used by said encoder by a constant factor.

5. A method as claimed in claim 2, further comprising a step of adaptably modulating the quality of encoded pictures produced by any one of said encoders as a function of the spatial energy of macroblocks of said pictures.

6. A device for controlling the global bitrate of an assembly of video encoders of the MPEG type which concurrently operate in parallel to encode respective video pictures of different types T identified as I, P, or B, respectively signifying an intraframe encoding mode independent of any other picture, or a predictive encoding mode employing a unidirectional motion prediction based on another intraframe-encoded for predicted picture, or a bidirectional interpolation encoding mode based on a previous picture and a subsequent picture; said device comprising:

at the output of each encoder, a picture complexity calculation circuit for determining a complexity of each considered picture, said complexity being equal to the product of the number of bits used for coding a picture and the mean quantization step employed in said coding; and a control unit for
   (i) determining, for each encoder and each presented picture, a picture complexity coefficient which is inversely proportional to the complexity of a preceding picture of the same type T and also is proportional to a sum of the complexities of all the pictures of a group of pictures to which the presented picture belongs, and
   (ii) computing, for each macroblock of a presented picture, a bitrate of the relevant encoder and its quantization step, said quantization step being determined by the product of a fixed reaction coefficient and the contents of a virtual buffer, said contents being equal to the product of the picture complexity coefficient and the number of bits employed for encoding said picture within a given time interval, minus the average number of bits which can be transmitted within said time interval, so as to maintain a predetermined constant global bitrate D.

\* \* \* \* \*